United States Patent
Wolf et al.

(10) Patent No.: US 10,255,805 B1
(45) Date of Patent: Apr. 9, 2019

(54) TRAFFIC SIGNAL EMULATION USING GENETIC ALGORITHM

(71) Applicants: VOLKSWAGEN AG, Wolfsburg (DE); AUDI AG, Ingolstadt (DE); PORSCHE AG, Stuttgart (DE)

(72) Inventors: Joerg Christian Wolf, Foster City, CA (US); Michael Zweck, Gaimersheim (DE); Christoph Rucker, Ingolstadt (DE)

(73) Assignees: Volkswagen AG (DE); Audi AG (DE); Porsche AG (DE)

( * ) Notice: Subject to any disclaimer, the term of this patent is extended or adjusted under 35 U.S.C. 154(b) by 0 days.

(21) Appl. No.: 15/881,905

(22) Filed: Jan. 29, 2018

(51) Int. Cl.
*G01S 1/02* (2010.01)
*G08G 1/096* (2006.01)
*G08G 1/095* (2006.01)

(52) U.S. Cl.
CPC .............. *G08G 1/096* (2013.01); *G01S 1/026* (2013.01); *G08G 1/095* (2013.01)

(58) Field of Classification Search
CPC ........ G01S 1/026; G01S 1/028; G01S 5/0252; G08G 1/096
USPC ......................................................... 340/929
See application file for complete search history.

(56) References Cited

U.S. PATENT DOCUMENTS

| | | | | |
|---|---|---|---|---|
| 7,139,740 B2* | 11/2006 | Ayala | ................. | G05B 13/0265 706/26 |
| 7,298,327 B2* | 11/2007 | Dupray | ................... | G01S 1/028 342/451 |
| 7,555,383 B2* | 6/2009 | Siegel | .................... | G01S 13/66 342/357.59 |
| 9,396,657 B1 | 7/2016 | Bauer et al. | | |
| 2001/0022558 A1* | 9/2001 | Karr, Jr. | .................. | G01S 1/028 342/450 |
| 2006/0129314 A1* | 6/2006 | Gi Ryoong | ........ | G01C 21/3415 701/533 |
| 2011/0254701 A1 | 10/2011 | Yamada | | |
| 2014/0107912 A1* | 4/2014 | Yucel | .................... | G07C 5/085 701/123 |
| 2017/0124863 A1 | 5/2017 | Dumazert et al. | | |

FOREIGN PATENT DOCUMENTS

CN          103699933 A     4/2014

OTHER PUBLICATIONS

Connected Signals; Enlighten; Oct. 2, 2017; downloaded from https://itunes.apple.com/us/app/enlighten/id695298744?mt=8.
Turky et al.; The Use of Genetic Algorithm for Traffic Light and Pedestrian Crossing Control; IJCSNS International Journal of Computer Science and Network Security; Feb. 2009; vol. 9, No. 2; pp. 88-96.
Yan et al.; Electronic Circuit Automatic Design Based on Genetic Algorithms; Procedia Engineering; 2011; vol. 15; pp. 2948-2954.

* cited by examiner

*Primary Examiner* — John A Tweel, Jr.
(74) *Attorney, Agent, or Firm* — Barnes & Thornburg LLP (57) ABSTRACT

Systems, components, and methodologies are provided for improvements in operation of automotive vehicles by enabling emulation of traffic signal operation by genertic algorithms, providing tunable solutions for efficient and safe operation.

17 Claims, 8 Drawing Sheets

| EXAMPLE OF GENES | |
|---|---|
| NEW_RUNG | NEW HORIZONTAL LINE IN THE CIRCUIT STARTS |
| PED_BUTTON | PEDESTRIAN BUTTON (INPUT) |
| RED_LIGHT | RED LIGHT (OUTPUT) |
| LATCH1 | A LATCH KEEPS THE OUTPUT SIGNAL ON AFTER AN IMPULSE |
| LATCH2 | |
| INTERNAL_INPUT | INTERNALLY LABELLED INPUT HAS A REFERENCE TO AN INTERNAL OUTPUT, TIMER OUTPUT, OUTPUT OR LATCH. |
| INTERNAL_OUTPUT | INTERNAL OUTPUT |
| TIMER1_200SEC, INTERNAL_OUTPUT_T4.0/DN | A TIMER AND ITS AUTOMATICALLY ASSOCIATED CONNECTORS. |

EXAMPLE CHROMOSOME REPRESENTATION AS A STRING: NEW_RUNG, INTERNAL_INPUT (T4.0/DN), TIMER1_200SEC, INTERNAL_OUTPUT_EN, INTERNAL_OUTPUT_/DN, NEW_RUNG, LIM_160,....

TRAFFIC SIGNAL EMULATION USING GENETIC ALGORITHM

FIELD

The present disclosure relates to systems, components, and methodologies for predicting traffic signal behavior. More particularly, the present disclosure relates to systems, components, and methodologies for predicting traffic signal behavior for communication to operate vehicles.

BACKGROUND

Traffic signals communicate important and/or useful information regarding roadway operations. However, traffic signals such as traffic lights can provide a coarse communication system enabled merely for direct, one-way signalling without additional information. Such coarse communications can inherently create inefficiencies and/or can cause discomfort in the driving experience. Predicting operation of traffic signals can mitigate the inefficiencies and/or discomfort created by coarse communications by accurately anticipating traffic signal behaviour permitting appropriate driving response.

SUMMARY

Accordingly, emulation of traffic signals using genetic algorithms to provide emulation logic circuits can enhance the driving experience. By anticipating traffic signal operation using such emulation, inefficiencies and/or discomforts associated with typically coarse traffic communications can be avoided while maintaining the ease of comprehensive logic circuit implementation. According to the present disclosure, systems, components, and methodologies are provided for traffic signal emulation for use in predicting operation of traffic signals of a traffic network.

According to at least one disclosed embodiment, a traffic emulation system for predicting operation of traffic signals of a traffic network may include a vehicle and a control system in communication with the vehicle for predicting operation of at least one traffic signal. The control system may include a circuit engine configured to determine a logic circuit as an output representative of predictive operation of at least one traffic signal. The circuit engine may include a phenotype module for providing populations of candidate phenotypes and may include an evaluation module for selecting parent phenotypes from the populations of candidate phenotypes for breeding to form successive generations of populations. The candidate phenotypes may each include an expression of respective traffic signal genotypes. The logic circuit may include at least one selected candidate phenotype from among the populations.

In some embodiments, the circuit engine may determine the logic circuit as the at least one selected candidate phenotypes responsive to a threshold achievement of the traffic signal genotypes of the selected candidate phenotypes. The threshold achievement may include a threshold level of accuracy in predicting past traffic signal operation. The threshold achievement may include determining that the logic circuit predicts the timing of initiation of a green phase of the at least one traffic signal within a range of +/−2 seconds of past traffic signal operation. The timing of initiation may be predicted along horizon of about 2 minutes.

In some embodiments, at least one traffic signal genotype of at least one of the candidate phenotypes may include a timer. The timer may be a duration for maintaining a selected phase of the at least one traffic signal. In some embodiments, the logic circuit may be a tunable logic circuit. The tunable logic circuit may be a programmable logic controller logic diagram.

In some embodiments, an origin generation of candidate phenotypes may include origin phenotypes each including at least one variant traffic signal genotype from the other origin phenotypes. In some embodiments, the parent phenotypes selected for breeding may each include at least one variant traffic signal genotype from the other parent phenotypes.

In some embodiments, the control system may include a prediction engine which may include a logic module for operating the logic circuit according to inputs to predict future traffic signal operation. The prediction engine may include a forwarding module in communication with the logic module to iterate the logic diagram to resolve faster than real time operation of the logic module to predict future traffic signal operation. The forwarding module may resolve faster than real time operation of the logic module based on at least one of recent traffic information and relevant traffic information. The forwarding module may resolve faster than real time operation of the logic module to provide a horizon 2 minutes into the future.

In some embodiments, the prediction engine may communicate an operational output indicating a prediction of traffic signal operation to the vehicle. The vehicle may include a display for communicating an indication of the operational output to the driver.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Traffic control devices, such as traffic signals, provide important guidance and communication for roadway vehicle operation. Yet, even properly implemented traffic control devices can create inefficiencies. For example, a typical 3-phase (red, amber, green) traffic light can generate vehicle and/or traffic inefficiencies due to driver reaction lag time as an inherent consequence of the coarse, reactionary style of communication. Predicting the operation of the traffic control device can allow vehicles to operate with increased efficiency, safety, and/or improved comfort. For example, correctly predicting that a vehicle has enough time to safely drive through a green phase traffic signal can avoid the need to suddenly decelerate the vehicle, which may cause discomfort and/or hazard.

Figure 1:
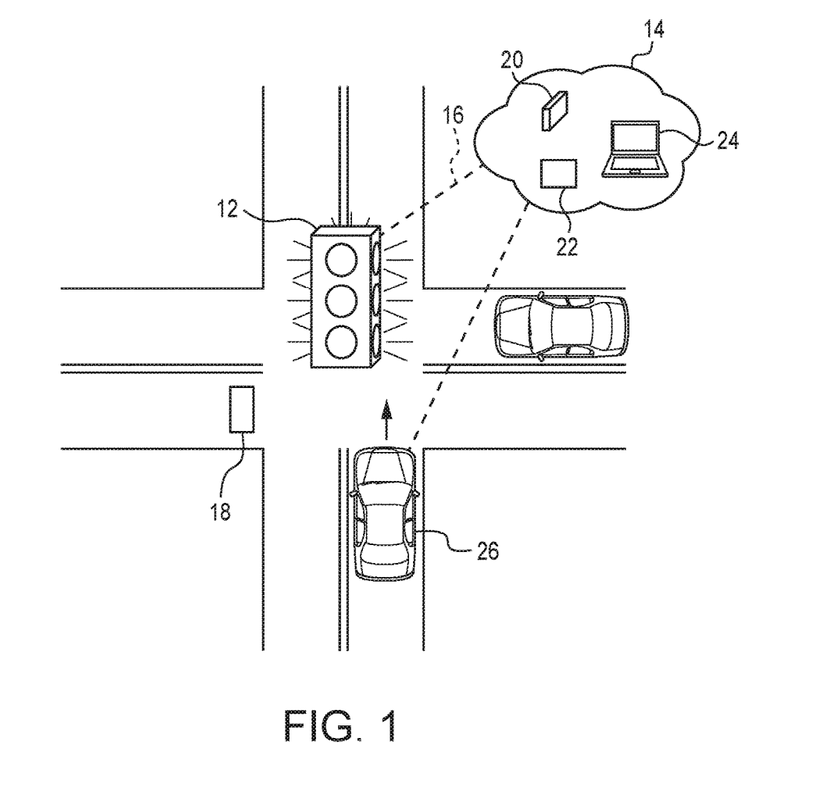
FIG. 1 is an overhead plan view of a roadway traffic intersection showing a traffic signal for conducting traffic through the intersection and a computer network in communication with a vehicle on the roadway to provide a traffic emulation to facilitate prediction of operation of the traffic signal.

As shown in FIG. 1, a traffic light 12 is oriented to govern the flow of traffic through a roadway intersection. The traffic light 12 may be a portion of a traffic system of the surrounding area. The traffic system may include numerous traffic lights, indicators, signs, and/or other traffic control devices. The traffic system may be in communication with a network 14 to communicate traffic information, as represented by communication link 16 between the traffic light 12 and the network 14, although traffic information may be communicated through devices of the traffic system other than the traffic light 12 itself, for example, through a communication hub. Traffic information may include light phases (i.e., red, yellow, green), phase timing, triggering of detectors (e.g., vehicle detector loops 18, pedestrian crosswalk request buttons), and/or other intersection and/or traffic related information.

The network 14 may be formed as a data collection and/or processing center. The network 14 may include various processors 20, databases 22, terminals 24, and/or other hardware and/or or software for data collection and/or processing. The processors 20 may execute instructions for developing and/or implementing emulations as discussed herein, and may communicate with the various databases 22, terminals 24, and/or other components to achieve their functions. The network 14 may develop and operate an emulation system to predict an operation of the traffic light 12 based on information received from the traffic system. For example, the prediction of the operation of the traffic signal may be a prediction that a lamp of the signal pertaining to a specific lane of traffic will change from red to green phase within a specific time period.

Figure 2:
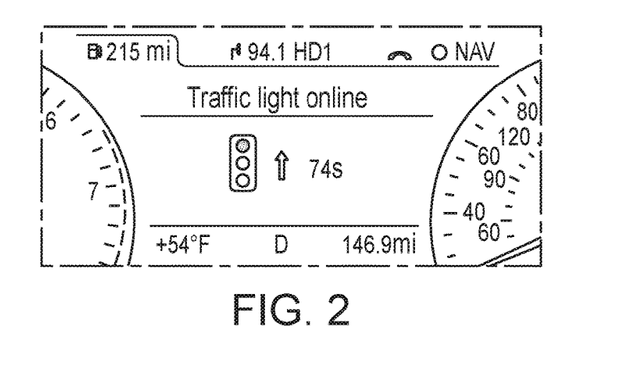
FIG. 2 is screenshot of an driver information screen of the vehicle providing a visual indication of a prediction of the operation of the traffic signal of FIG. 1.

The network 14 may be in communication with a vehicle 26 near the intersection. The network 14 may communicate an indication of the prediction of the operation of the traffic light 12 to the vehicle 26. As shown in FIG. 2, the indication of the prediction may be presented to the driver for decision making in operating the vehicle. The driver can decide to maintain or change driving operation based on the indication of the prediction. For example, the driver may observe that the traffic light 12 is predicted to remain indicating a red phase to the vehicle 26 for a countdown of 74 seconds. In response, the driver may decide to reduce the speed of the vehicle 26 (slightly) to allow additional time before reaching the intersection. The driver's slight speed adjustment may permit the traffic light 12 to change to green phase in the relevant lane to avoid the need for vehicle 26 to stop at a red phase light. By communicating anticipated traffic signal operation, the driver can be afforded the opportunity to better synchronize vehicle operation with the traffic signal. Thus, the inefficiency of stopping the vehicle 26 may be avoided, under the circumstances.

Predicting traffic controller functions may be achieved by certain direct efforts. Examples of direct efforts may include developing computational software simulation and/or by training neural networks to simulate the outcomes of the target controller. Such simulations can provide application specific and/or "black box" outcomes which can be elegant solutions, but may not suit every problem. For example, in predicting traffic signal operation, it may be desirable for traffic engineers to assess proposed solutions with detailed review of the underlying solution components to enhance safety and/or provide tunability of the solution.

The present disclosure includes an emulation system which develops flexible and/or tunable logic diagrams that precisely emulate traffic signal operation. Emulation using logic diagrams, such as a programmable logic controller (PLC) diagrams, can provide emulation outcomes that can be easily tuned by traffic engineers to enhance safety, reliability, resolve bugs, and/or otherwise improve the emulation. As discussed in additional detail herein, the PLC diagram can be modified directly with thoughtful input by experienced traffic engineers providing a precise and tuned emulation, and may avoid reconstructing the prediction process.

Figure 3:
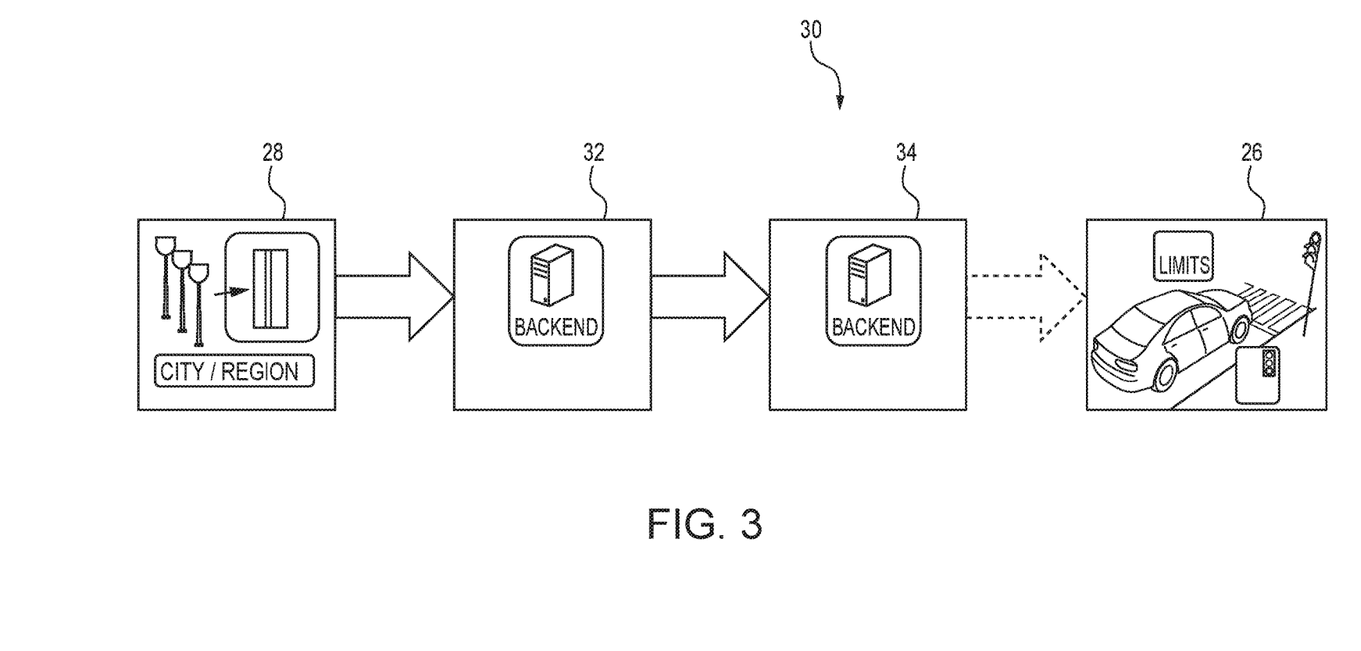
FIG. 3 a process flow chart of the traffic emulation of FIG. 1 showing that a traffic network communicates traffic information regarding the traffic signal with content providers of the computer network which communicate prediction information with the vehicle.

Referring now to FIG. 3, a flow is illustrated for developing and implementing prediction of the operation of the traffic light 12. The traffic system 28 may communicate traffic information to an emulation system 30 to generate a control logic for prediction of operation of the traffic light 12. As discussed in additional detail below, the emulation system 30 applies the control logic to generate the prediction of operation of the traffic light 12. The emulation system 30 may be provided by a single content provider 32 or may be provided in collaboration with an optional additional content providers 34, and may include the vehicle 26. The content provider 32,34 may communicate an indication of the prediction of operation of the traffic light 12 to the vehicle 26.

Figure 4:
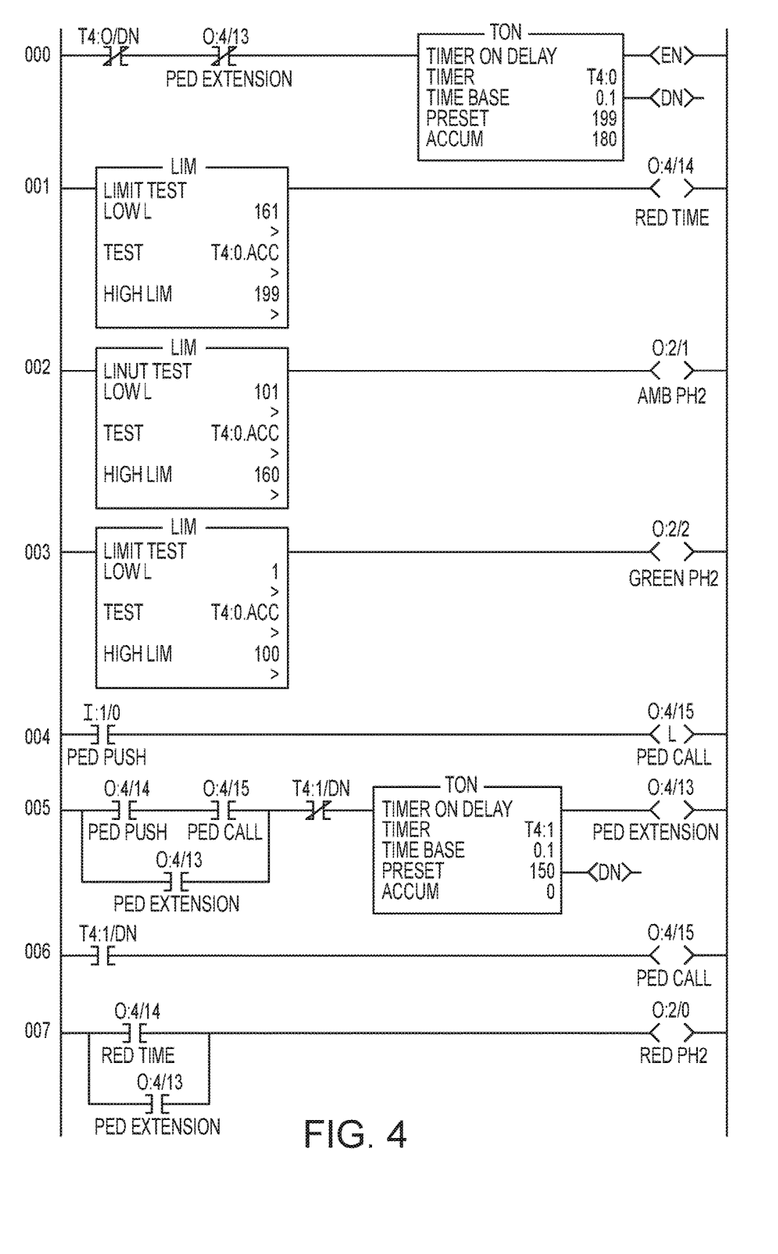
FIG. 4 is a logic diagram indicating the operation of the traffic signal of FIG. 1.

As shown in FIG. 4, an exemplary control logic emulation of a traffic light 12 is shown as a PLC or ladder logic diagram. The diagram may include rungs 000 to 007. Rungs 000 to 003 may represent a traffic light using a timer (T4.0) counting from 161 to 199 seconds. Rung 004 may have a Pedestrian Button (I:1/0) and a latch memory 0:4/15 recalling that the button was pressed (Call). Rung 005 may include a timer (T4.1). When the timer (T4.1) has finished, it resets the call in Rung 006 affording the pedestrian additional time for crossing the intersection by maintaining the corresponding red light phase indication for a longer period than if the Pedestrian Button were not pressed.

Given the immense number of possible arrangements of logic diagrams for traffic lights having different operations and timing plans, a genetic algorithm can be applied to create an emulation of a given traffic light. By beginning with a population of candidate logic diagrams having timers of different periods for phase (e.g., red, green, amber) and internal connections, a genetic algorithm can generate output PLC diagrams (emulations) providing comprehensive design and tunability. The genetic algorithm generates offspring logic diagrams for evaluation to refine the output diagram to render an accurate and precise emulation of the traffic signal.

Figure 5:
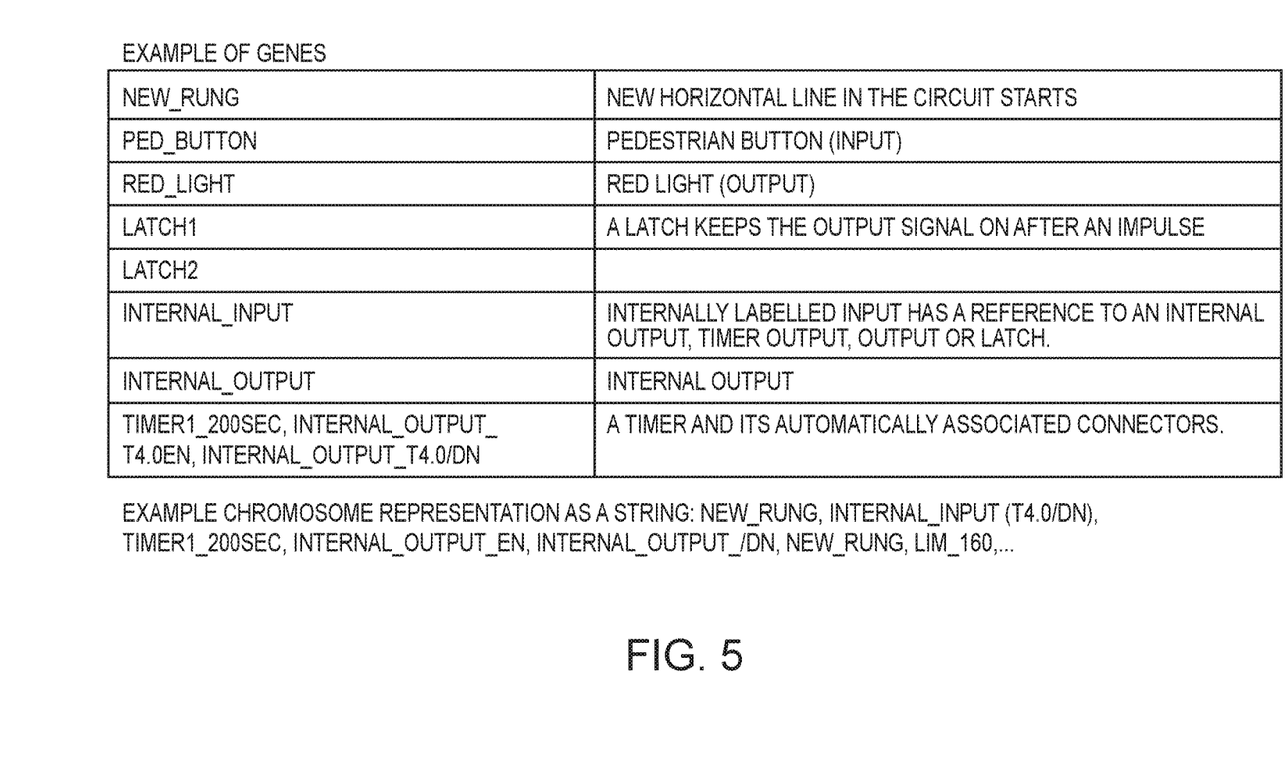
FIG. 5 is a chart indicating potential variables of the logic diagram of FIG. 4, which can constitute genotype expressions.

The candidate logic diagrams may contain unique genetic expressions, or genotypes. The genes of each genotype may include the specific rungs (NEW_RUNG) of the candidate PLC diagrams, for example, Rungs 000 through 007, as previously discussed. As shown in FIG. 5, other genes may include Pedestrian Buttons (PED_BUTTON), Red Light phase output (RED_LIGHT), Latches (LATCH1 and LATCH2) which may maintain the output signal after an impulse, internal inputs and/or outputs (INTERNAL_INPUT, INTERNAL_OUTPUT), and timers with associated connectors (TIMER_200SEC, INTERNAL_OUTPUT_T4.0EN, INTERNAL_OUTPUT_T4.0/DN). In some embodiments, genes may include any suitable type of operational parameter and/or subparameter relevant to the traffic signal. The set of genes may define a chromosomal representation as a string of parameters, for example, NEW_RUNG, INTERNAL_INPUT (T4.0/DN), TIMER1_200SEC, INTERNAL_OUTPUT_EN, INTERNAL_OUTPUT_/DN, NEW_RUNG, LIM_160, . . . .

The genotypes of each candidate PLC diagram (phenotype) may be selectively applied to form the offspring PLC diagrams as progeny candidate phenotypes. The genetic algorithm may selectively incorporate genes of various candidate (parent) phenotypes into the offspring phenotype. Genes from parent phenotypes (logic diagrams) may be applied by suitable genetic operators, such as crossover, mutation, selection, regrouping, colonization-extinction, and/or migration to produce the progeny phenotype. By refining the PLC diagram phenotypes through later generations, the genetic algorithm can optimize the output PLC diagram to provide an optimized logic diagram for accurate and precise emulation of the traffic light.

Figure 6:
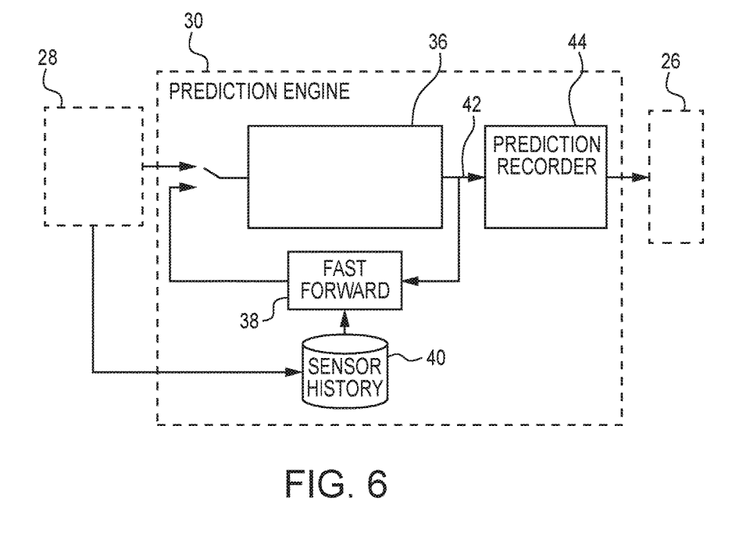
FIG. 6 is a diagrammatic flow chart of an emulation system for providing the traffic emulation of FIG. 1 showing that the emulation system includes a prediction engine including a logic module having a logic circuit (diagram) for execution using traffic input information and being operated in a fast forward cycle for developing a traffic signal prediction output.

Referring to FIG. 6, an implementation of the emulation system 30 may be formed to include a prediction engine. The prediction engine may include a logic module 36 for executing iterations of the optimized logic diagram. The logic module 36 may receive initialization information from the traffic system 28 to allow syncing of the emulation prediction with actual conditions. A fast forward module 38 may accelerate the execution of the logic module 36 based on prediction criteria 40 to achieve a future prediction output from the logic diagram. The prediction criteria 40 may include historical information pertinent to the traffic light 12 being emulated. For example, the prediction criteria 40 may include recent historical information (e.g., hourly information), corresponding relevant information (e.g., today is Monday and historical information pertaining to Mondays may be applied, time of day/year, etc.), and/or combinations thereof. The prediction criteria 40 may include any variety of pertinent information to provide emulation for prediction, for example, but without limitation, weather, time, and/or traffic whether past, present, or predictive. The traffic system 28 may provide updated initialization information to the logic module 36 as it is available and/or occurs.

The fast forward module 38 may iterate the logic module 36 based on prediction criteria 40 to generate an optimized operational output 42. The operational output 42 may include information regarding the emulated operation of the traffic light 12, for example, the amount of time before the traffic light changes from red to green phase. The operational output 42 may be communicated to the vehicle 26 for communication to the driver. The operational output 42 may be recorded in a prediction recorder 44 for storage and retrieval. In some embodiments, the operational output 42 may include predictive information beyond a single predicted timing of phase changes of the traffic signal 12, for example, may include a variety of predictive operations such as the timing of the next two phase changes for the traffic signal, timing for phases for multiple traffic signals, and may include any contributing factors (e.g., timer lengths, inputs, etc.) for their predictions.

Figure 7:
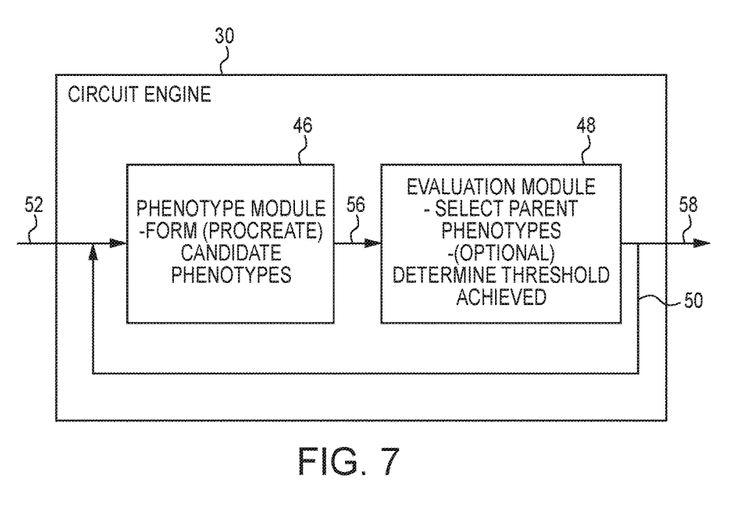
FIG. 7 is a diagrammatic view of the emulation system of FIG. 6 showing that the emulation system includes a circuit engine operating as a genetic algorithm module for developing the logic diagram of the prediction module according by fitness evaluation and showing that the circuit engine includes a phenotype module for proving populations of candidate phenotypes for potential breeding, the phenotypes representing solution domains for logic circuit (diagrams) emulating the traffic signal, and an evaluation module for selecting parent phenotypes for breeding to form successive generations of phenotypes and for determining threshold achievement of evaluation criteria of the phenotypes.

Referring now to FIG. 7, the emulation system 30 may include a circuit engine for determining the logic circuit (diagram) for application by the logic module 36. The circuit engine may apply a genetic algorithm methodology to determine the logic circuit. The circuit engine may include a phenotype module 46 for providing populations of candidate phenotype circuits. The circuit engine may include an evaluation module 48 for selecting parent phenotypes 50 from among the populations of candidate phenotypes. The evaluation module 48 may output parent phenotypes 50 for breeding by the phenotype module 46 to form new generations of candidate phenotypes.

The circuit engine may receive inputs 52 for forming origin generation phenotypes as the initial candidate phenotypes. The inputs 52 may include complete phenotypes from past operation of the traffic light 12. In some embodiments, the inputs 52 may include artificial and/or baseline phenotypes designed to correlate with behavior of traffic signals generally and/or the traffic light 12 to improve accuracy, speed, and/or other performance of the emulation. In some embodiments, the inputs 52 may include individual genetic information (i.e., less than a complete circuit phenotype) for use in the phenotype module 46 to generate candidate phenotypes.

The phenotype module 46 may apply genetic operators to generate a new population of candidate phenotypes. Genotypes of parent phenotypes 50 selected by the evaluation module 48 may be utilized (bred) according to the genetic operators to produce the next generation of candidate phenotypes. Ordinarily, the phenotype module 46 may combine as parents, only pairs of phenotypes from the same generation, however, in some embodiments, parental contribution from more than two phenotypes and/or cross-generational breeding may be applied. The specific genetic operation may be configured in consideration of various factors, for example, safety, accuracy, precision, speed, complexity, practicality, and/or diversity, among others.

The evaluation module 48 may conduct selection of new parent phenotypes from among the candidates phenotypes. The evaluation module 48 may receive communication of a population of candidate phenotypes (indicated by arrow 56 in FIG. 7) of each generation from the phenotype module 46. The evaluation module 48 may select parent phenotypes from the candidate phenotypes for communication to the phenotype module 46 for further breeding. Parent phenotypes may be selected according to fitness of their solution.

The evaluation module 48 may evaluate the candidate phenotypes by iteration (emulation) using historical information. The evaluation module 48 may apply synchronization information and known inputs (e.g., sensor inputs from pedestrian buttons, vehicle detector loops 18, etc.) for a historical reference time period to the candidate phenotypes as an emulation. The evaluation module 48 may compare the output of the emulation of each candidate phenotype to the known historical operation of the traffic light 12. For example, the output of the emulation may include emulation phase timing (red, amber, green) of the traffic light 12 and the evaluation module 48 may compare the emulation phase timing to the actual historical phase timing during the historical reference time period. For example, the evaluation module 48 may compare the emulation phase timing (timing of changing the phase) of the traffic light 12 from red to green, $t_e$, with the actual historic phase timing of the traffic light 12 from red to green, $t_h$.

The evaluation module 48 may rank, score, and/or rate the performance of the emulation phase timing phase of each candidate phenotype compared to the historical phase timing. The evaluation module 48 may assign penalty points in the rank, score, and/or rating system as a fitness function to candidate phenotypes for each emulation timing phase which is inaccurate in comparison to the historical timing phase. In some embodiments, the evaluation module 48 may apply any suitable number, type, and/or form of evaluation criteria. The fittest or best performing candidate phenotypes may be selected as parent phenotypes 50 for communication to the phenotype module 46 to produce the following generations.

The evaluation module 48 may determine the logic circuit (diagram) for application in the logic module 36. The evaluation module 48 may determine the logic circuit as at least one selected candidate phenotype which accomplishes a threshold achievement of traffic signal operation. For example, the evaluation module 48 may determine the logic circuit as at least one selected candidate phenotype which achieves an emulation phase timing within +/−2 seconds of the historical phase timing (e.g., emulated phase timing predicts a change from red to green within +/−2 seconds compared with historical operation of the traffic light 12). In some embodiments, threshold achievement of traffic signal operation may include +/− time periods less than 2 seconds, threshold accuracy across multiple historical scenarios, and/or any suitable number, type, and/or combination of traffic signal related criteria. The evaluation module 48 may communicate the logic circuit to the logic module 36 (indicated by arrow 58 in FIG. 7) for implementation to predict traffic light operation.

Figure 8:
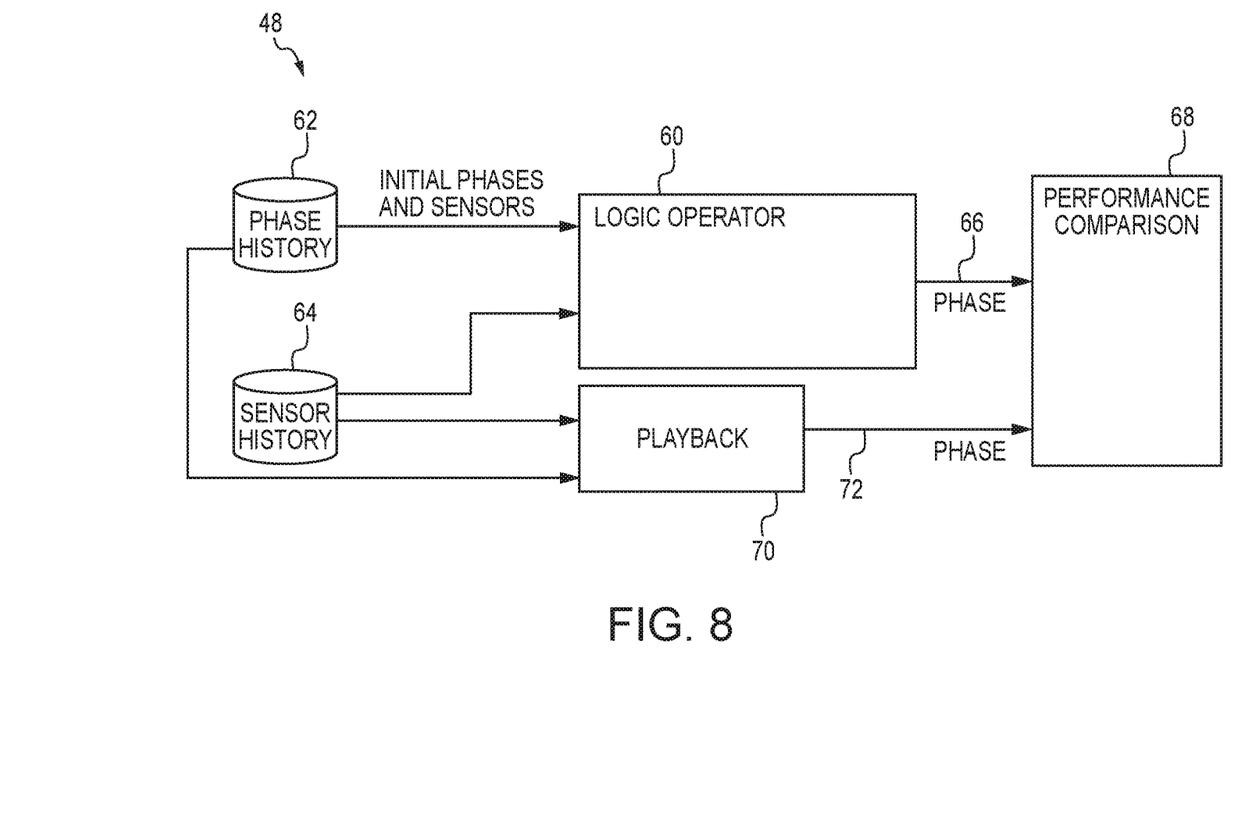
FIG. 8 is a process flow chart of operation of the logic module of FIG. 7 showing that a performance comparison is performed between predicted and historical traffic signal operations to select parent phenotypes for breeding

As shown in FIG. 8, the evaluation module 48 may evaluate each candidate phenotype by execution and comparison. The evaluation module 48 may include a logic operator 60 for execution of the candidate phenotypes of the phenotype module 46. The logic operator 60 may receive as inputs initialization information regarding the traffic light 12, for example, the actual time of a historical phase change from a phase history source 62 to synchronize the state of operation of the candidate phenotypes with the historical operation of the traffic light 12. The logic operator 60 may receive actual historical operational inputs, for example, historical sensors inputs such as pedestrian button presses and/or triggering of vehicle detectors 18 from a sensor history source 64. The logic operator 60 may execute emulation of the candidate phenotype according to the initialization information and/or operational inputs.

The logic operator 60 may generate an operational output 66 indicating prediction of traffic light operation. The operational output 66 may include emulated timing phase information, for example, the timing of a change of the traffic light 12 from red to green phase. In some embodiments, the operational output 66 may include information regarding any number, type, and/or related information to the prediction of traffic light operation. For example, the operational output 66 may include predictive timing for multiple phase changes. The logic operator 60 may communicate the operational output 66 to a performance comparison module 68.

The evaluation module 48 may include a playback operator 70 for evaluating historical traffic signal operation. The playback operator 70 may receive historical phase and/or sensor information from the phase and sensors sources 62, 64. The playback operator 70 may evaluate historical traffic signal operation to extract a comparison output 72 for communication to the performance comparison module 68. The comparison output 72 may include reference historical information equitable with the operational output 66 to evaluate the sufficiency of the candidate phenotypes. For example, the operational output 66 and the comparison output 72 may each indicate information regarding a timing of change of the traffic light 12 from red to green, namely the emulation phase timing and the historical phase timing, respectively. The comparison output 72 is communicated to the performance comparison module 68 for evaluation of the sufficiency of the candidate phenotype.

The performance comparison module 68 may perform comparison analysis between the operational output 66 and the comparison output 72. The performance comparison module 68 may determine a difference between the emulation phase timing indicated by the operational output 66 compared to the historical phase timing indicated by the comparison output 72. The performance comparison module 68 may determine whether the differences between the phase timings of the operational output 66 and the comparison output 72 are within a tolerance threshold, for example, +/−4 seconds. The performance comparison module 68 may rank, score, or rate each candidate phenotype according to the comparison analysis. For example, as previously mentioned, the performance comparison module may award penalty points for each incorrect emulation phase timing. Incorrect emulation phase timing may include those phase timings which exceed the tolerance threshold. In some embodiments, the number of penalty points assessed may vary according to the degree of inaccuracy, for example, such that +/−3 seconds difference in phase timings may receive 3 penalty points while +/−5 seconds of difference in phase timings may receive more than 3 penalty point. The performance comparison module 68 may identify the highest performing phenotypes for selection as parent phenotypes 50 for communication to the phenotypes module 46 for further breeding.

As previously mentioned, an example of individual candidate phenotype as a circuit may be evaluated by the use of a fitness function for comparison analysis. The fitness function may depend on the quality requirements of the prediction for the particular traffic signal. Continuing from the example that the relevant emulation prediction includes prediction of the time for the traffic light 12 to change phase from red to green in the lane relevant to the vehicle, the table in FIG. 9 compares two candidate phenotypes as "Individual A" and "Individual B" to historical data of operation of the traffic light 12.

For fitness evaluation an emulation may run each candidate circuit for $t_{120}$=120 steps (seconds). In an exemplary fitness function, the phase change time output of the emulation circuit for the traffic light to turn green can be expressed as $t_{EmuGreen}$. The prediction of each circuit for each time step can be expressed as $T_{GreenPred}(t)=t_{EmuGreen}-t$. The reference historical data when the light really turned green can be expressed as $t_{RefGreen}$, and each time step can be expressed as $T_{GreenRef}(t)=t_{RefGreen}-t$. Thus, the error of each emulation can be expressed as $$MSE = \frac{1}{t_{120}} \sum_{1}^{t_{120}} (T_{GreenPred}(t) - T_{GreenRef}(t))^2,$$

and the fitness f can be expressed as the inverse of the error, $$f = \frac{1}{1 + MSE}.$$

Figure 9:
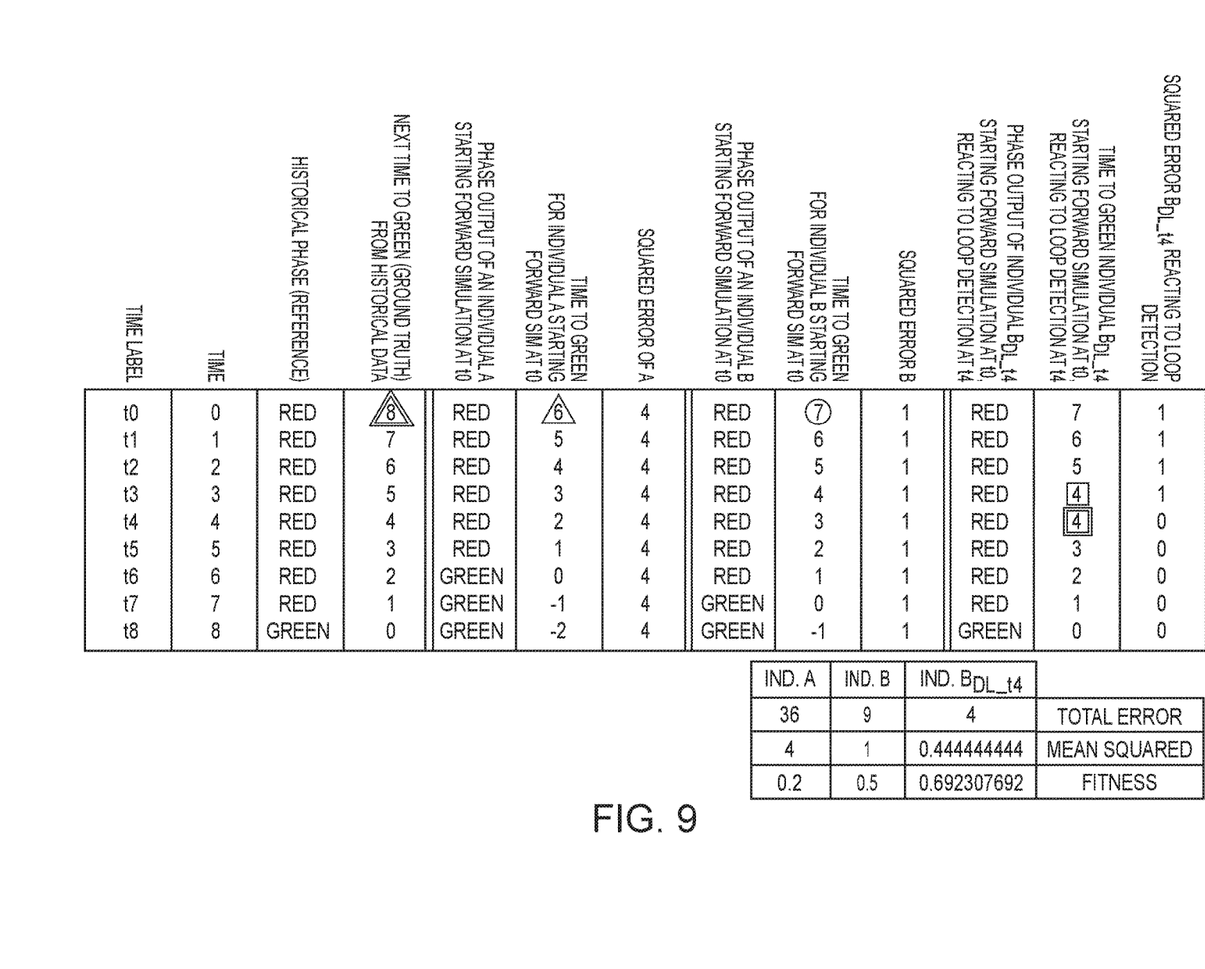
FIG. 9 is a table of exemplary emulation phase timing outputs in comparison to historical phase timing of a traffic signal showing that a fitness is determined for each candidate (Individual A and B), and showing an emulation phase timing output for Individual B including an input as a detector loop trigger at time $t_4$.

For descriptive purposes, the table in FIG. 9 includes exemplary comparison values for 8 seconds of signal operation. As shown in FIG. 9, Individual A and Individual B are executed for 8 seconds ($t_0$ to $t_8$) and their respective phase color output and their prediction of time until change to green phase is shown for each time interval. For example, Individual A has predicted that at time to the phase will change to green in 6 seconds from to (triangle in FIG. 9). The actual historical data indicates that the phase change to green occurred at 8 seconds from to (double triangle in FIG. 9). In the present example, Individual A's prediction times for each time period ($t_0$-$t_8$) deviate from the historical data by 2 seconds resulting in a square error of 4 for each time interval, and a total squared error of 36, the mean squared error of Individual A predictions being 4 and the fitness being 0.2.

Similarly, values for Individual B predictions are provided. Individual B has predicted a phase change to green at 7 seconds from to (circle in FIG. 9), yielding a mean squared error of 1 and a fitness of 0.5. Although Individuals A and B have produced consistent predictions along each time interval, i.e., constant countdown from their initial predictions, not all phenotypes and/or iterations may produce such results.

An example of a second emulation of Individual B is shown considering a relevant vehicle detector loop that triggered at time $t_4$ (i.e., trigger at 4 seconds from $t_0$) in the historical data, indicated as Individual $B_{DL\_t4}$. Notably, for the emulation of Individual $B_{DL\_t4}$, the prediction of the time of phase change at time $t_3$ is 4 seconds (square in FIG. 9). Based on the input of the detector loop trigger, the prediction remains 4 seconds at time $t_4$ (double square in FIG. 9), extending the time until light change due to the vehicle detector loop triggering. The resultant mean squared error is 4 and fitness 0.69. Accordingly, the Individual $B_{DL\_t4}$ with the detector loop triggered at time $t_4$ achieves a higher fitness for the given circumstances.

Figure 10:
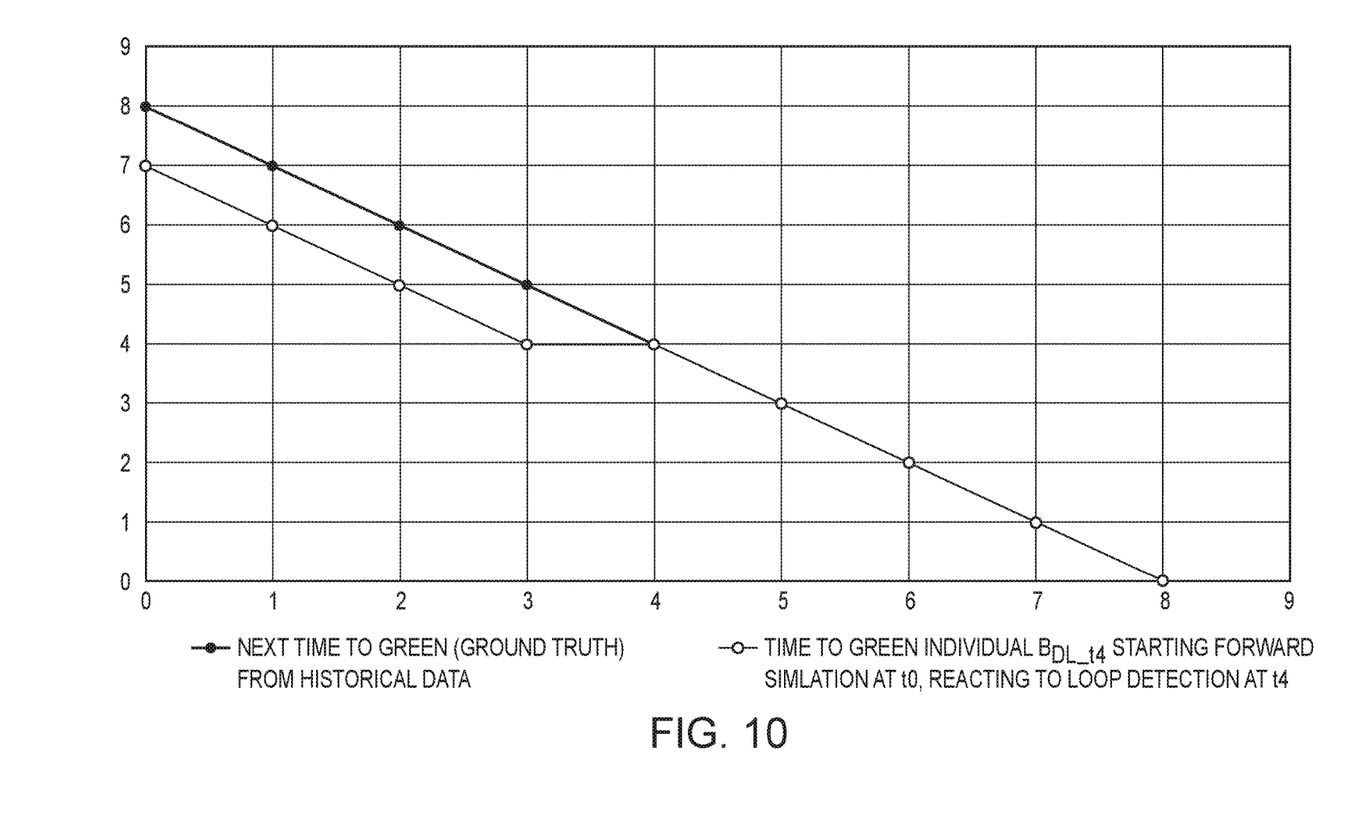
FIG. 10 is a graph of an Individual B emulation phase timing output of FIG. 9 compared to the historical phase timing showing that Individual B including an input as a detector loop trigger at time $t_4$, correctly predicted the time of phase change at times $t_4$ through $t_8$.

As shown in FIG. 10, a graph of the phase change time shows the emulation compared with the actual historical information. The vertical axis represents the predicted amount of time until phase change against the horizontal axis representing the time interval $t_1$. For the Individual $B_{DL\_t4}$, the predicted amount of time remains 4 seconds between $t_3$ and $t_4$. The the Individual $B_{DL\_t4}$ with the detector loop triggered at time $t_4$ as indicated by historical data is consistent with the actual historical operation for time periods $t_4$ through $t_8$.

In the present disclosure, the performance comparison module 68 may determine the logic circuit for use in the logic module 36. The performance comparison module 68 may determine whether the candidate phenotypes meet the threshold achievement. For example, as previously mentioned, the performance comparison module 68 of the evaluation module 48 may determine whether selected candidate phenotypes achieve an emulation phase timing within +/−2 seconds of the historical phase timing (e.g., emulated phase timing predicts a change from red to green within +/−2 seconds compared with historical operation of the traffic light 12). In some embodiments, the threshold achievement may be defined as a minimum level of fitness, for example, fitness of at least 0.8, and/or may require achievement of thresholds for multiple evaluation scenarios. When the performance comparison module 68 determines that a candidate phenotype meets the threshold achievement, the comparison module 68 may determine that candidate phenotype as the logic diagram for application by the logic module 36.

Accordingly, a genetic algorithm (GA) approach can provide a useful emulation of traffic signals in PLC based logic. As previously mentioned, the development of the logic circuit by genetic algorithm can permit tunability of the emulation solution as a PLC diagram. Traffic engineers can readily assess the PLC diagram to review the emulated operations of the traffic light 12. A skilled traffic engineer can manually tune or modify the emulated operations of the PLC diagram. For example, a traffic engineer may increase the length of a timer to enhance safety in a particular operation. Moreover, it may be desirable to implement broad strategic protections in the predictions to accommodate inaccuracies and/or to err on the side of caution, whether for safety or otherwise—i.e., to tune the emulation to conservatively predict traffic signal operation without negatively effecting the overall emulation. The comprehensiveness of the PLC diagram (circuit) as the emulation base can provide a known platform for review and/or tuning by the traffic engineer. The use of PLC based emulation can avoid the need for additional software engineers and/or programmers to interpret and implement the review and/or tuning of the traffic engineer. Accordingly, improved emulation can be achieved in an efficient manner.

The present disclosure includes devices, systems, and methods for generating an emulation of a traffic signal using a genetic algorithm. For example, in providing traffic information to a driver to enhance the driving experience, it may be desirable to predict when a traffic light will turn green (as the traffic light itself does not outwardly communicate future phase changes). Additionally or alternatively, vehicles can operate (or be operated) more smoothly by anticipating the timing of a change to a red phase (light) allowing a smooth slow down and stop. For example, anticipating the change from yellow to red phase can assist in avoiding the need for harsh braking caused by a last minute stop. The length of a current phase of the traffic light may be influenced by detector inputs such as vehicles driving over loop detectors buried in the road or pedestrian walk requests. In some existing traffic systems, the light phase changes and the detector inputs may be provided from the governmental traffic control center from which traffic light operation may be determined. However, the large variety of traffic signal controllers, configurations, and timing plans, modelling and emulation may be required. Creating such emulations by generic algorithm to generate PLC-based emulation enables creation of tunable logic circuits that can enhance the transparency of the emulation. The genetic algorithm may include a genetic representation of the solution domain for the traffic signal emulation, and a fitness function to evaluate the solution domain.

As many traffic signals are relatively simple in operation, a PLC programmed by ladder logic diagram, for example, including various flip flops, relays, and timers, can provide a preferred emulation format tunable by traffic engineers. The PLC diagram can be formed by genetic algorithm to provide accurate emulation while maintaining tenability. Fast forwarding the emulation can provide a prediction of future traffic signal operation. Fast forwarding may include using statistically generated traffic-related inputs (i.e., pedestrian calls, vehicle detection) to advance the emulation for future prediction.

For a given emulation horizon into the future of, for example, 2 minutes, a traffic signal may be emulated. The relevant output traffic signal behavior (e.g., timing of a phase change of a traffic light to green phase) may be compared to historical data. The process of prediction may be repeated as the vehicle approaches the traffic signal. Although in some embodiments certain traffic-related inputs to the emulation may be generated statistically and/or otherwise, as the vehicle approaches the traffic signal, new and/or updated information may be obtained such as actual traffic-related inputs as they occur. The output traffic signal behavior may change as the new and/or updated information occurs. Accordingly, the prediction may be updated. In features and/or embodiments in which deviation of the prediction from historical data is evaluated, a sliding window of deviation may be applied. In some embodiments, the new and/or updated information may be applied to the logic circuit to update the prediction and/or to the fitness function in evaluating the fitness of the candidate phenotypes for either or both of selection of parent phenotypes for breeding and/or determination of the logic diagram for execution in the prediction engine.

In some embodiments, basic rules may be imposed on the genetic algorithm, for example, to limit the search space. The phenotype PLC diagrams may include inputs being first in the rungs and followed by outputs. When an internal_output disappears it may be removed from other references in the circuit. In some embodiments, the output rung for the green light may be predefined to prevent conflicting phases such that light signals for counterpoised (or otherwise non-complimentary) traffic lanes may not turn green simultaneously and/or within overly close time periods from each other.

Embodiments of the present disclosure include formation and execution of emulation circuits on the network 14, namely by the processors 20 in communication with various components, and providing emulation outputs to the vehicle 26, for example, to an in-vehicle navigation system. In some embodiments, the emulation system may include processors and communications circuitry local to the traffic signal itself and may locally communicate traffic signal predication information to the vehicle, for example, directly by wireless communication by generic manner such as by cellular communication (3G/4G/5G LTE) and/or dedicated manner such as dedicated short range communication (DSRC). In some embodiments, emulation formation and/or execution may be partly or wholly performed by in-vehicle hardware and/or software, for example, on-board processors, storage devices, and/or communications circuitry. In illustrative embodiments, emulation information may be communicated to the driver via a dashboard display with other driving information. In some embodiments, emulation information may be presented on an in-vehicle display screen separate from the dashboard, for example, a display screen of an in-vehicle infotainment system. In some embodiments, emulation outputs may be communicated to an in-vehicle automated driving control system for consideration in determining guidance of the vehicle 12 having partial or wholly automated vehicle operation, with or without distinct notification of the driver. As previously mentioned in the exemplary scenario of marginally slowing a vehicle's speed to avoid stopping at a traffic signal, application of the devices, systems, and/or methodologies of the present disclosure can provide corresponding energy efficiency gains and/or reduced component wear by reducing and/or eliminating stopping. Moreover, reducing the reaction time, number of reactions, and/or reaction intensity required by the driver (and/or automated driving system) can improve the comfort of the driving experience, for example, by reducing the intensity of stop-and-go traffic.

By conducting prediction of traffic signal behavior through emulation using logic circuits, a tunable logic circuit enables comprehensive review and/or diagnosis of the solution output by qualified traffic engineers, without the need for redevelopment of the solution itself. The uniform, comprehensive nature of the logic diagram output can simplify the human involvement in the development process, enhancing safety and economy by taking advantage of existing architecture and language for traffic engineering. Accordingly, the devices, systems, and methodologies of the present disclosure define advantages over alternative solutions to traffic signal problems, providing a tunable resource approach to predictive behavior implementation.

The present disclosure includes developing and providing predictions of traffic signal behavior to a driver and/or automated driving system of a vehicle. In some embodiments, additional information may be provided to the driver and/or automated driving system, for example, warnings corresponding to the predictive information (e.g., anticipated red light violation warnings according to current conditions, warnings that a pedestrian call button has been activated) and/or recommended driving maneuvers (e.g., recommended speed indication in order to "catch" or avoid a stop light). Such additional information may be developed as part of and/or on the basis of the operational output, wholly or partly by the emulation system 30 itself (whether local and/or remote to the traffic signal) and/or by on-board vehicle systems, such as an on-board vehicle navigation and/or automated driving system.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, disclosed embodiments are deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. A traffic emulation system for predicting operation of traffic signals of a traffic network comprising:
   a vehicle,
   a control system in communication with the vehicle for predicting operation of traffic signals, the control system including a circuit engine for determining a logic circuit as an output representative of predictive operation of at least one of the traffic signals, the circuit engine including a phenotype module for providing populations of candidate phenotypes and an evaluation module for selecting parent phenotypes from the populations of candidate phenotypes for breeding to form successive generations of populations, the candidate phenotypes each comprising an expression of respective traffic signal genotypes, the logic circuit comprising at least one selected candidate phenotype from among the populations.

2. The traffic emulation system of claim 1, wherein the circuit engine determines the logic circuit as the at least one selected candidate phenotypes responsive to a threshold achievement of the traffic signal genotypes of the selected candidate phenotypes.

3. The traffic emulation system of claim 2, wherein the threshold achievement includes a threshold level of accuracy in predicting past traffic signal operation.

4. The traffic emulation system of claim 3, wherein the threshold achievement includes determining that the logic circuit predicts the timing of initiation of a green phase of the at least one traffic signal within a range of +/−2 seconds of past traffic signal operation.

5. The traffic emulation system of claim 4, wherein the timing of initiation is predicted along a horizon of about 2 minutes.

6. The traffic emulation system of claim 1, wherein at least one traffic signal genotype of at least one of the candidate phenotypes includes a timer.

7. The traffic emulation system of claim 4, wherein the timer is a duration for maintaining a selected phase of the at least one traffic signal.

8. The traffic emulation system of claim 1, wherein the logic circuit is a tunable logic circuit.

9. The traffic emulation system of claim 8, wherein the tunable logic circuit is a programmable logic controller logic diagram.

10. The traffic emulation system of claim 1, wherein an origin generation of candidate phenotypes includes origin phenotypes each including at least one variant traffic signal genotype from the other origin phenotypes.

11. The traffic emulation system of claim 1, wherein the parent phenotypes selected for breeding each include at least one variant traffic signal genotype from the other parent phenotypes.

12. The traffic emulation system of claim 1, wherein the control system further comprises a prediction engine including a logic module for operating the logic circuit according to inputs to predict future traffic signal operation.

13. The traffic emulation system of claim 12, wherein the prediction engine includes a forwarding module in communication with the logic module to iterate the logic diagram to resolve faster than real time operation of the logic module to predict future traffic signal operation.

14. The traffic emulation system of claim 13, wherein the forwarding module resolves faster than real time operation of the logic module based on at least one of recent traffic information and relevant traffic information.

15. The traffic emulation system of claim 13, wherein the forwarding module resolves faster than real time operation of the logic module to provide a horizon 2 minutes into the future.

16. The traffic emulation system of claim 13, wherein the prediction engine communicates an operational output indicating a prediction of traffic signal operation to the vehicle.

17. The traffic emulation system of claim 16, wherein the vehicle includes a display for communicating an indication of the operational output to the driver.

* * * * *